(No Model.)

J. F. ROSE.
MATCH SAFE.

No. 583,203. Patented May 25, 1897.

WITNESSES

INVENTOR
Joseph F. Rose.
BY
Edgar Tate & Co.
ATTORNEYS.

THE NORRIS PETERS CO., PHOTO-LITHO., WASHINGTON, D. C.

UNITED STATES PATENT OFFICE.

JOSEPH F. ROSE, OF TIVERTON, RHODE ISLAND.

MATCH-SAFE.

SPECIFICATION forming part of Letters Patent No. 583,203, dated May 25, 1897.

Application filed September 23, 1896. Serial No. 606,773. (No model.)

*To all whom it may concern:*

Be it known that I, JOSEPH F. ROSE, a citizen of the United States, and a resident of Tiverton, in the county of Newport and State of Rhode Island, have invented certain new and useful Improvements in Match-Safes, of which the following is a specification, reference being had to the accompanying drawings, forming a part thereof, in which similar numerals of reference indicate corresponding parts wherever found throughout both views.

This invention relates to match-safes; and the object thereof is to provide an improved safety device of this class which is simple in construction and operation and comparatively inexpensive.

The invention is fully disclosed in the following specification, of which the accompanying drawings form a part, in which—

Figure 1:
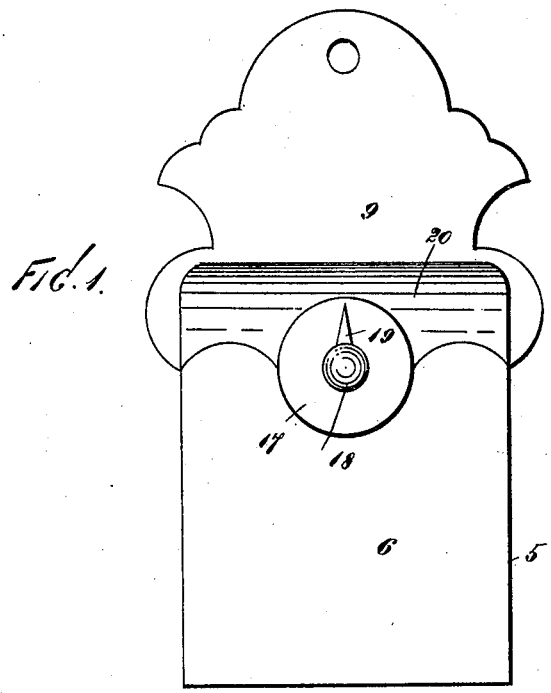
Figure 2:
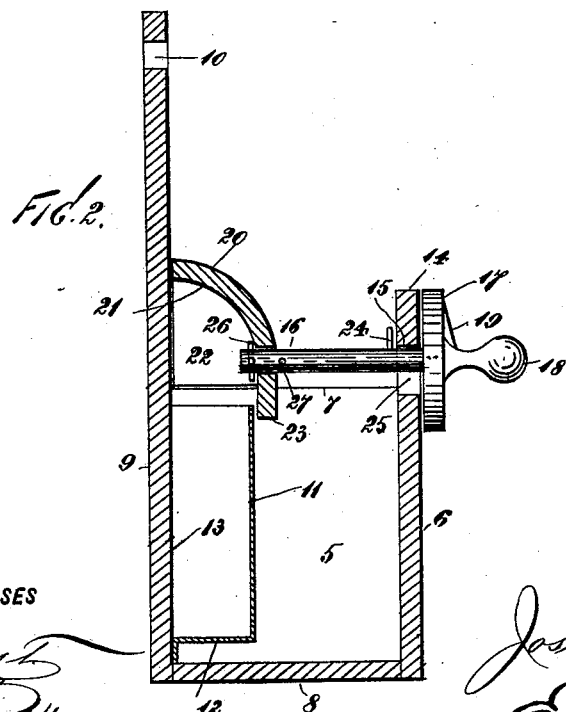

Figure 1 is a front view of my improved match-safe, and Fig. 2 a central vertical section thereof.

In the practice of my invention I provide a match-safe which comprises a box or casing 5, which is preferably angular in form and which consists of a front 6, sides 7, bottom 8, and a back 9, and the back is preferably projected upwardly and provided with a perforation 10, by which the match-safe may be suspended from a suitable support, and the upper portion of the back may be ornamented to any desired extent. Secured to the back 9 within the box or casing is a vertical casing 11, which is closed at the bottom, as shown at 12, and open at the top, whereby a match-receptacle 13 is formed. The front 6 is also projected above the top of the box or casing, as shown at 14, and said front is also provided centrally thereof with an opening 15, through which passes a shaft 16, which is provided at its outer end with a disk or plate 17, on which is formed a knob or handle 18, above which is a pointer 19. I also provide a shield or cover 20 for the receptacle 12, and this shield or cover is preferably substantially triangular in cross-section and consists of a front 21 and end pieces 22, but one of which is shown, and the front 20 projects downwardly between the sides 7 of the box or casing, as shown at 23, and the shaft 16 passes centrally into said shield or cover and is secured therein in any desired manner. The shaft 16 is also provided near its outer end with a pin 24, and the inner end of said shaft is revoluble in the shield or casing 21, and below the opening 15 in the front, through which the shaft 16 passes, is a vertical slot 25.

The operation will be readily understood from the foregoing description when taken in connection with the accompanying drawings and the following statement thereof.

The shaft 16 is revoluble, as hereinbefore described, in the shield or cover 20, and is held therein by transverse pins 26 and 27, and said shield or cover may be pulled outwardly by means of said shaft by turning the shaft by means of the knob or handle 18 until the pointer 19 projects downwardly, when the pin 24 will register with the slot 25, and when the pointer 19 projects upwardly, as shown in the drawings, the shaft cannot be drawn outwardly.

The matches are placed in the receptacle 13, and the shield or cover 20 is moved back into the position shown in Fig. 2, and the shaft 16 is turned so that the pin 24 projects upwardly, as shown in said figure, and in this position of the parts the matches will be retained in the receptacle 13 and cannot be removed therefrom in any position in which the box or casing is held, and whenever it is desired to remove a match from said receptacle the shaft 16 must be manipulated, as above described, and the shield or cover 20 drawn outwardly.

The bottom 8 of the box or casing is not essential and may or may not be employed, and it is evident that changes in and modifications of the construction herein described may be made without departing from the spirit of my invention or sacrificing its advantages.

Having fully described my invention, I claim as new and desire to secure by Letters Patent—

1. A match-safe, consisting of a box or casing, which is open at the top, and the back and front of which are projected upwardly, said box or casing being provided with a match-receptacle, which is secured to the back thereof, and open at the top, and a movable shield or cover which is mounted on the sides of the box or casing, over the receptacle, and adapted to be moved back and forth over said receptacle, substantially as shown and described.

2. A match-safe, consisting of a box or casing, which is open at the top, and the back and front of which are projected upwardly, said box or casing being provided with a match-receptacle, which is secured to the back thereof, and open at the top, and a movable shield or cover which is mounted on the sides of the box or casing, over the receptacle, and adapted to be moved back and forth over said receptacle, said cover or shield being provided with a shaft which is revolubly mounted therein, and which passes through the upwardly-directed projection of the front of the box or casing, substantially as shown and described.

3. A match-safe, consisting of a box or casing, which is open at the top, and the back and front of which are projected upwardly, said box or casing being provided with a match-receptacle, which is secured to the back thereof, and open at the top, and a movable shield or cover which is mounted on the sides of the box or casing, over the receptacle, and adapted to be moved back and forth, over said receptacle, said cover or shield being provided with a shaft which is revolubly mounted therein, and which passes through the upwardly-directed projection of the front of the box or casing, and is provided at its outer end with a disk or head having a knob or handle, substantially as shown and described.

4. A match-safe, consisting of a box or casing, which is open at the top, and the back and front of which are projected upwardly, said box or casing being provided with a match-receptacle, which is secured to the back thereof, and open at the top, and a movable shield or cover, which is mounted on the sides of the box or casing, over the receptacle, and adapted to be moved back and forth over said receptacle, said cover or shield being provided with a shaft which is revolubly mounted therein, and which passes through the upwardly-directed projection of the front of the box or casing, and is provided at its outer end with a disk or head, having a knob or handle, the opening in the front of the box or casing through which the shaft passes, being provided with a vertical slot, which communicates with the lower side thereof, and said shaft being provided with a pin, which is adapted to pass through said slot, substantially as shown and described.

In testimony that I claim the foregoing as my invention I have signed my name, in presence of the subscribing witnesses, this 18th day of September, 1896.

JOSEPH F. ROSE.

Witnesses:
ISAAC L. BROUNELL,
CHARLES A. DURFEE.